C. O. Crosby
Collarette.

Nº 41907     Patented Mar. 15. 1864

Witnesses
A. French
John E. Earl

Inventor
C. O. Crosby

UNITED STATES PATENT OFFICE.

C. O. CROSBY, OF NEW HAVEN, CONNECTICUT.

IMPROVEMENT IN COLLARETTES.

Specification forming part of Letters Patent No. 41,907, dated March 15, 1864.

*To all whom it may concern:*

Be it known that I, C. O. CROSBY, of New Haven, in the county of New Haven and State of Connecticut, have invented a new and Improved Ruffle, which I style "Collarette;" and I do hereby declare the following to be a full, clear, and exact description of the same, when taken in connection with the accompanying drawings, and the letters of reference marked thereon, and which said drawings constitute part of this specification, and represent, in—

Figure 1:
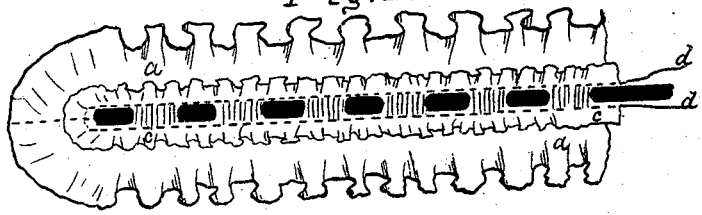
Figure 2:
Figure 3:
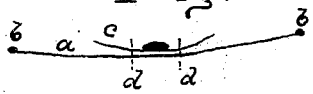
Figure 4:
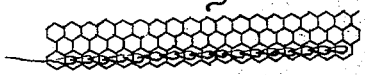

Figure 1, a view of a part of a complete collarette; Fig. 2, a longitudinal central section; Fig. 3, a transverse section; and in Fig. 4, an enlarged view of a portion of the meshes of the lace, to more fully illustrate a part of my invention.

To enable others skilled in the art to make my collarette, I will proceed to describe it.

I prefer to make my collarette from narrow strips or ribbons of lace, commonly called "bobbinet" or "footing," but think muslin may be used.

I first take a strip, $a$, of lace and run a single line of chain-stitches upon each edge. (See Figs. 1, 3, and 4.) To make this chain more ornamental I usually use colored silk or thread, the chain lying upon the cut or what is to be the upper side. (See Fig. 3, $b\ b$). I do this upon the sewing-machine known as the "Wilcox & Gibbs machine," and make the stitches in the outer line of meshes by passing the needle down through each successive mesh, as see Fig. 4, so that one stitch is made to each mesh and drawn as taut as may be without fulling the lace. This finishes and makes a neat, beautiful, and ornamental edge. I next introduce one end of the strip of lace, the chain of the stitch side up, into the frilling-machine, for which Letters Patent were granted to myself and Henry Kellogg, bearing date the 2d day of December, 1862. At the same time I introduce a second but narrower strip of similar material, $c$, Figs. 1 and 3, upon the upper side, and in or near the center of the first or wider strip. I run them through the frilling and double-stitching apparatus, as described in the aforesaid Letters Patent, which crimps or plaits and stitches together the two strips with two rows of stitching, $d\ d$, Fig. 3. When thus run through the machine, I cut the strip into proper lengths for my collarette, about fifteen inches long.

To finish the ends I draw together the two edges, both of the wide and narrow strips, and stitch the edges of both together, thus forming a rounded end, as see Fig. 1, and making the chain of stitches apparently continuous around the outer edge. I next, through the center and between the two rows of stitches, $d\ d$, run a cord of velvet chenille or other suitable ornamental material over and under several crimps, as see Figs. 1 and 2, blue denoting the cord. This I do with a large needle. It may, however, be done by any convenient contrivance. This done, and my collarette is complete.

Having thus fully set forth and described my invention, I claim—

The collarette herein described, as a new article of manufacture.

C. O. CROSBY.

Witnesses:
A. FRENCH,
JOHN E. EARL.